Sept. 5, 1961 N. H. EDSTRÖM 2,999,131

GROUP SELECTION STAGE FOR AUTOMATIC TELEPHONE EXCHANGES

Filed June 6, 1957 4 Sheets-Sheet 1

INVENTOR
NILS HERBERT EDSTRÖM
BY Kane and Nydick
ATTORNEYS

GROUP SELECTION STAGE FOR AUTOMATIC TELEPHONE EXCHANGES

Filed June 6, 1957 4 Sheets-Sheet 2

INVENTOR
NILS HERBERT EDSTRÖM
BY Hane and Nydick
ATTORNEYS

Sept. 5, 1961 N. H. EDSTRÖM 2,999,131

GROUP SELECTION STAGE FOR AUTOMATIC TELEPHONE EXCHANGES

Filed June 6, 1957 4 Sheets-Sheet 3

INVENTOR
NILS HERBERT EDSTRÖM

By Hane and Nydick

ATTORNEYS

GROUP SELECTION STAGE FOR AUTOMATIC TELEPHONE EXCHANGES

INVENTOR
NILS HERBERT EDSTRÖM
BY Hane and Nydick
ATTORNEYS 2,999,131

GROUP SELECTION STAGE FOR AUTOMATIC TELEPHONE EXCHANGES

Nils Herbert Edström, Hagersten, Sweden, assignor to Telefonaktiebolaget L. M. Ericsson, Stockholm, Sweden, a corporation of Sweden Filed June 6, 1957, Ser. No. 664,025
Claims priority, application Sweden June 21, 1956
2 Claims. (Cl. 179—18)

This invention relates to automatic telephone exchanges and especially to a group selection stage built of operating bars in primary and secondary cross bar switches connected by means of links. To the group selection stage there are connected on one hand incoming lines, on the other hand outgoing lines, each provided with a line equipment. A connected line may of course simultaneously be incoming and outgoing, if its line equipment is arranged for two-direction traffic.

A number of markers pertain to the group selection stage, which markers are set by registers belonging to the telephone exchange and which each contain a selection means for the selection of a free link and a free called line, each of the secondary operating bars belonging to the links being able, during a selection, only to select one line within the called group of lines.

When several markers serve the same lines there are usually arranged particular relays with connecting contacts for each marker and each traffic route, the number of connecting contacts being equal to the product of the number of markers and the number of lines. These contacts cause a great number of wires. The invention has for a purpose to avoid said relays and to reduce the number of connecting contacts or the like current closing means to one per line independent of the number of markers and the number of traffic routes and to arrange said contacts so, that the number of wires between the markers and the line equipments will be small. This is achieved on one hand by means of a device which connects the markers one at a time during separate selection moments, on the other hand by means of a first marking conductor, connected during the selection moment, for each link, which may be connected to the calling line, said marking conductor being multiplied both to the selection means in each of the markers and to the line equipment for each line, which may be connected to the link over its secondary operating bar for cross bar switches, and by means of a second marking conductor, connected during the selection moment, being multiplied both to the traffic route determining means in all markers and to the line equipment for each line within the group of lines which is called during the selection moment, and by means of a current closing device for each line, which in dependence on the fact that the line is free, is operated from the marker over the last mentioned marking conductor and closes a circuit over the first mentioned marking conductor for the selection and connection of the line under control of the selection means of the marker.

The invention will be described more closely by an embodiment with some variations, by means of the annexed drawings FIGS. 1–6.

Figure 1:
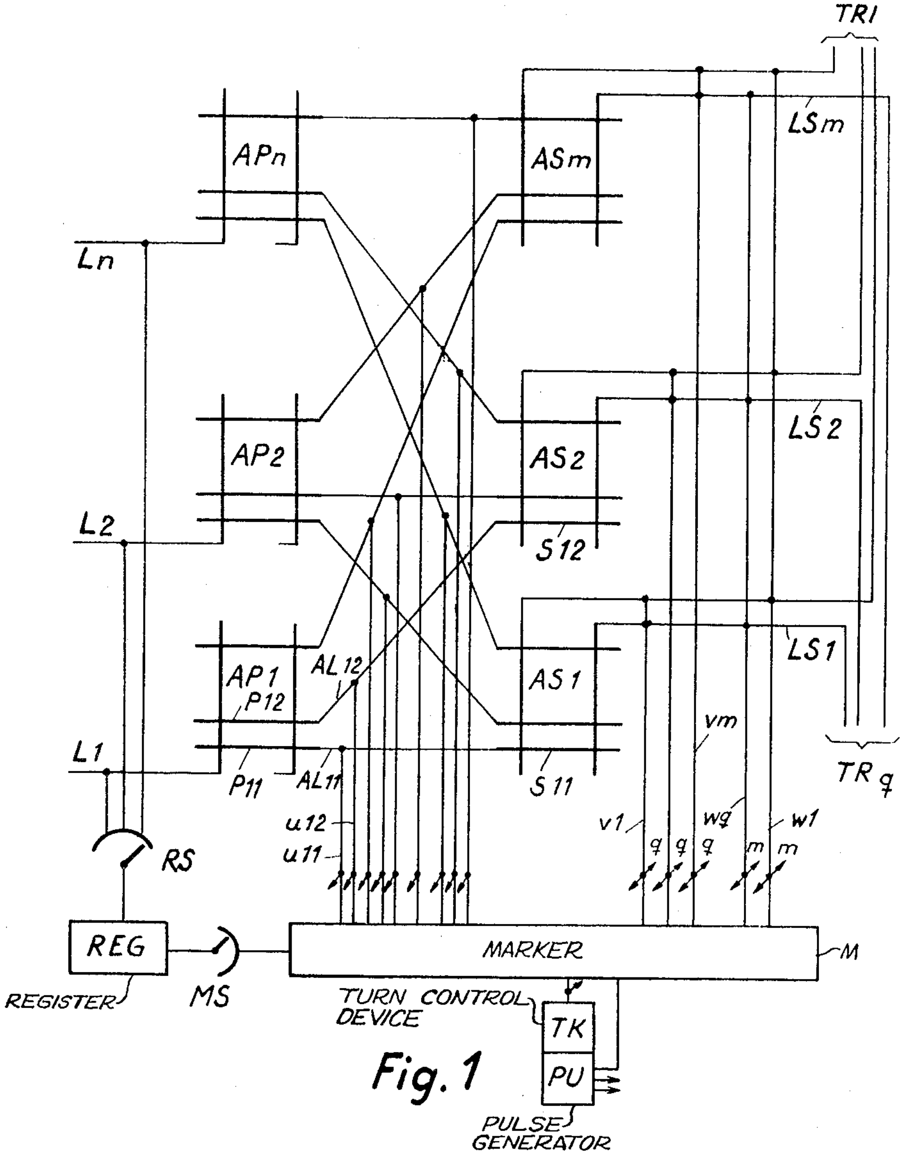
FIG. 1 shows a survey scheme for a group selection stage according to the invention.

In FIG. 1 AP1—AP*n* are primary and AS1—AS*m* secondary across bar switches. The lines L1—L*n* are incoming and LS1—LS*m* are outgoing. Two outgoing traffic routes TR1 and TR*q* are shown. The incoming lines L1—L*n* may be connected to registers REG over register connectors RS and the registers REG are connected to markers M over connectors MS. An impulse sending device TK—PU imparts separate working or selection moments to the markers M. The primary and secondary cross bar switches are connected by means of the links AL11, AL12. To each link there pertain a primary and a secondary operating bar for cross bar switches, e.g. the link AL11 with the operating bars P11 and S11 or the link AL12 with the operating bars P12 and S12. The links AL11, AL12 are connected in the usual manner to the markers over wires *u*11, *u*12, which are multiplied to individual contact devices for each marker. The called lines LS1—LS*m* are connected to the markers by means of current closing means, which are individual for each line, and on one hand over wires *v*1—*vm*, which are common for all lines connected to one and the same secondary cross bar switch, on the other hand over wires *w*1—*wq*, which are common for all lines pertaining to the same traffic route or part of a traffic route in the case that only some of the lines of the traffic route are tested in each selection moment. For the sake of simplicity it is assumed below that each traffic route comprises only one line from each secondary cross bar switch AS1—AS*m* according to FIG. 1 and that all lines of the traffic route are tested simultaneously in one selection moment.

Figure 2:
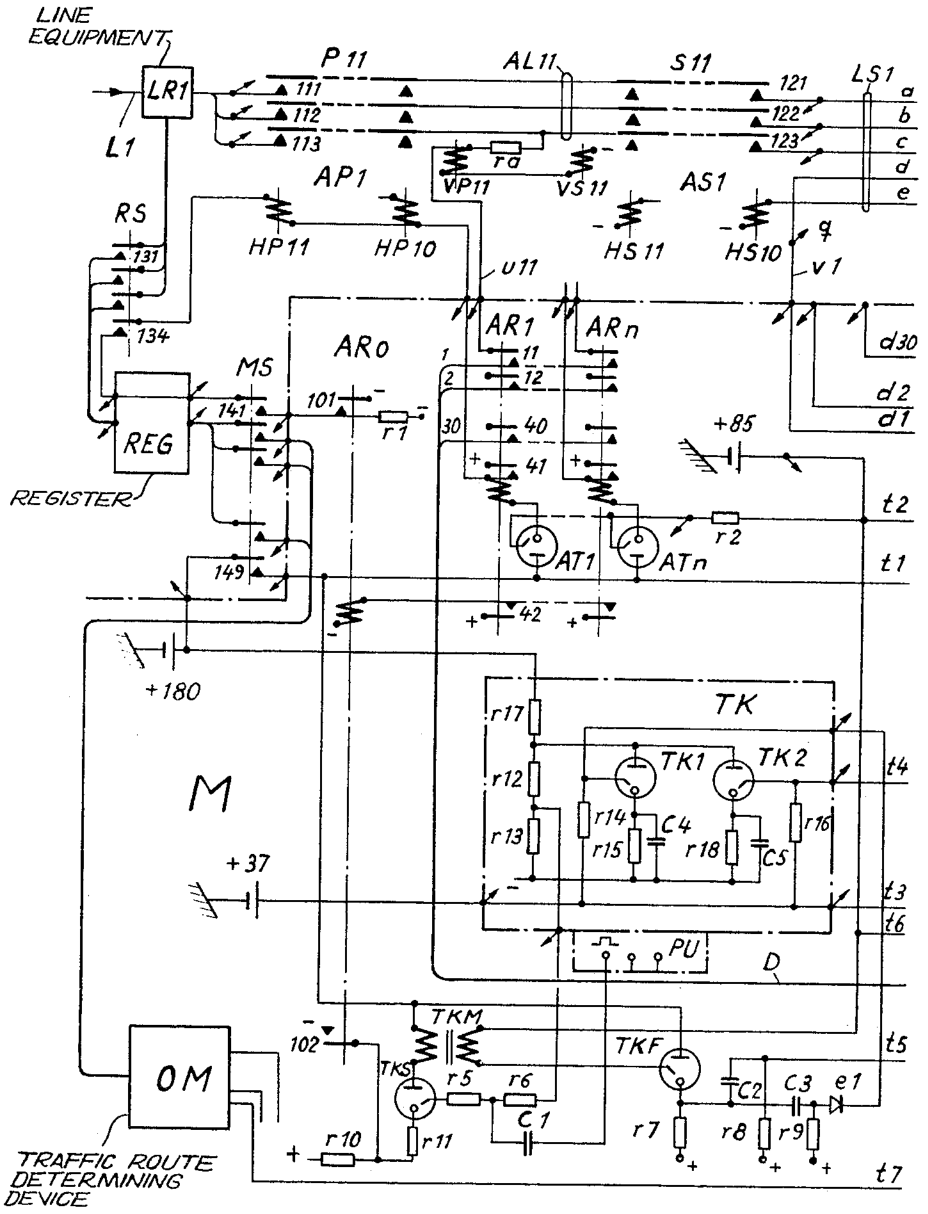
FIG. 2 shows primary and secondary operating bars for cross bar switches and a part of a marker.
Figure 3:
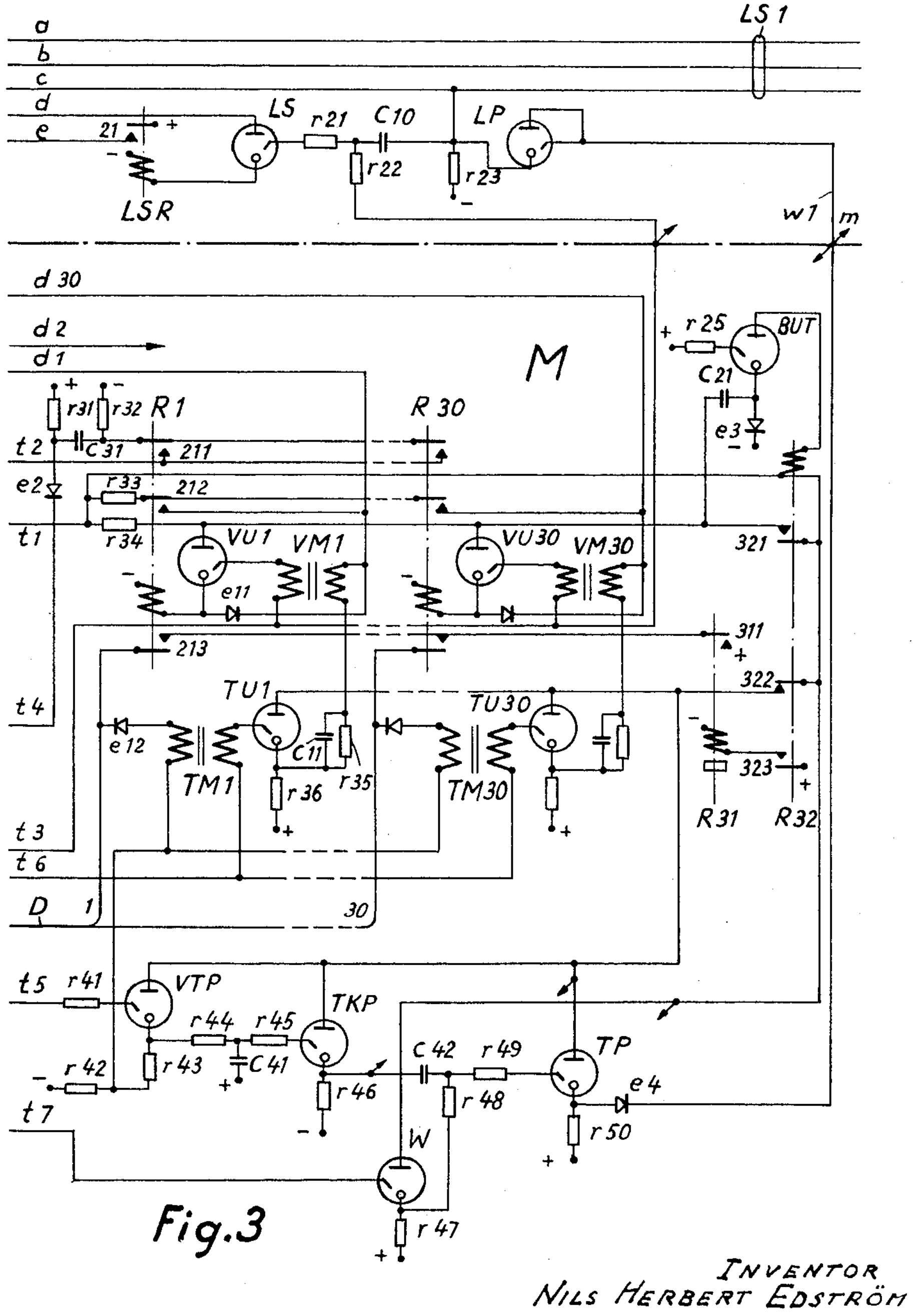
FIG. 3 shows a line equipment and the selection means in one of the markers.

A call on the line L1 in FIG. 1 causes the line L1 to be connected to a free register REG over a register connector RS. Signals, which indicate one of the traffic routes TR1—TR*q*, arrive over the line L1 to the register REG, which registers the signals and connects itself to a free marker M over the connector MS. Signals, which indicate the traffic route, are transmitted from the register REG to the marker M and are registered in the marker. The marker receives at short, even intervals impulses from a device TK, which connects the markers one by one for selection of a free line during separate selection moments. When the marker M is ready to select a free line in a certain traffic route and an impulse is received from the device TK, a free link, e.g. AL11 and a free line, e.g. LS1 are selected, which may be connected over the link AL11 to the calling line L1. The selected link and the line are marked busy immediately, the corresponding cross bar switches AP1 and AS1 thereby being also marked busy for other markers until the operating magnets of the operating bars P11 and S11 are operated and the marker has been released. Then a communication has been set up between the line L1 and the line LS1 over the operating bar P11, the link AL11 and the operating bar S11. FIGS. 2–3 show a suitable embodiment of the invention. The line L1 has a line equipment LR1, which, when a call arrives over the line, connects itself to a register REG over a register connector RS. The register is connected over a connector MS to the marker M. HP11—HP10 are the selecting magnets in the cross bar switch AP1 and HS11—HS10 are the selecting magnets in the cross bar switch AS1. VP11 and VS11 are operating magnets for the operating bars P11 and S11, respectively. AL11 is the link, which connects said operating bars. LS1 is an outgoing line. The marker M contains a relay AR1 and AR*n*, respectively, for each primary cross bar switch AP1 and AP*n*, respectively.

These relays have a contact, e.g. 11 for each link, e.g. AL11, which issues from the primary cross bar switch, e.g. AP1, corresponding to the relay. To enable only one primary cross bar switch at a time to be connected to a marker there is a separating means consisting of the glow discharge tubes AT1—AT*n*. OM is a registering device, which receives signals indicating the called traffic route from the register REG. The turn control device TK, which by means of pulses connects one marker at a time, is shown in FIG. 2 as well as the pulse receiving glow discharge tubes TKS, TKF and the pulse generator PU.

The equipment of the line LS1 is shown at the top of FIG. 3. In each marker M there is a line selecting device consisting of relays R1—R30, glow discharge tubes VU1—VU30 and TU1—TU30 with an auxiliary equipment. For each traffic route there are also two glow discharge tubes TP and W with accessories. The glow discharge tubes VTP and TKP supply pulses from the device TK, PU to the tube TP. The glow discharge tube BUT and the relays R31—R32 supply signals to the selecting and operating magnets in the crossbar switches, e.g. AP1 and AS1.

The poles of the exchange battery are indicated by plus and minus, the +pole being connected to earth. Three auxiliary batteries +37, +85 and +180 are indicated in FIG. 2.

A call over the line L1 operates the line equipment LR1 so that this is connected to the register REG over the register connector RS. The contacts 131—134 are closed. The register REG is set by signals over the line L1 and is connected to the marker M over the connector MS. The contacts 141—149 are closed. The following circuit is completed: earth, battery, +85, the resistance *r*2, the control gap of the glow discharge tube AT1, the winding on relay AR1, the selecting magnet HP11, the contact 134, the register REG, the contact 141, the resistance *r*1, to minus. If the cross bar switch AP1 is not connected to any other marker, the glow discharge tube AT1 will be ignited. The resistance *r*2 is high and prevents that the glow discharge tube AT1 in more than one marker at a time is ignited. The main gap of the glow discharge tube AT1 is ignited, when the discharge gap has been ignited, thus receiving current from the battery +180 over the contact 149. The relay AR1 attracts its armature, when the main gap has been ignited. The contacts 11—40, 41, 42 are closed. The relay AR*o* is attracted. The contacts 101—102 are closed. The selecting magnet HP11 is operated over the contacts 41, 134, 141 and 101. During the make time of the relays AR1 and AR*o* the registering device OM manages to be set and the traffic route is indicated over the wire *t*7, a suitable ignition voltage being supplied to the control gap of the tube W, which is ignited. Its main gap is ignited and receives current from the battery +180 over the contact 149 and the wire *t*1. The voltage drop over the resistance *r*47 is supplied over the resistances *r*48 and *r*49 to the control gap of the tube TP, which however is not yet ignited but only receives a bias, which marks the traffic route.

Then the turn of the marker M to select a free line is awaited. The control gap of the discharge tube TKS has a bias, which is determined by the voltage of the resistance *r*13 in the device TK. The resistance *r*13 is connected in series with the resistances *r*12 and *r*17 between the battery +180 and the minus side of the exchange battery. The glow discharge tubes TK1 and TK2 are supposed to be extinguished. A pulse from the pulse generator PU gives a current impulse over the condenser C1, the resistances *r*6 and *r*13 and the voltage over the resistances *r*6 and *r*13 is supplied to the control gap of the glow discharge tube TKS over the resistance *r*5. The glow discharge tube TKS ignites its control gap over the resistance *r*11 and the contact 102. The only purpose of the resistance *r*10 is to keep the cathode of the tube on a determined potential, when the marker M is free. The control gap of the glow discharge tube TKS is ignited and receives current from the battery +180 over the contact 149 and the link winding on the transformer TKM. Thus a voltage is induced in the link winding of the transformer TKM, which voltage is added to the voltage from the battery +85 and causes the ignition of the control gap of the glow discharge tube TKF. The main gap of the glow discharge tube TKF is ignited and a voltage drop arises over the resistance *r*7. A current impulse passes the condenser C3, the rectifier *e*1, the resistance *r*14, the battery +37, to earth. The resistance *r*9 has for a purpose to discharge the condenser C3. The voltage drop over the resistance *r*14 is added to the voltage from the battery +37 and is sufficient to ignite the control gap of the glow discharge tube TK1 in the device TK, which is common for the markers M. The main gap of the glow discharge tube TK1 is ignited and the following circuit is completed: earth, the battery 180, the resistance *r*17, the glow discharge tube TK1, the condenser C4, to minus. During the recharge time of the condenser C4 there is obtained a strong voltage drop over the resistance *r*17, which intends to extinguish the glow discharge tube TK2, if the main gap of this tube is ignited by current over the resistance *r*17. Then the main gap of the glow discharge tube TK1 glows with current through the resistance *r*15, the voltage drop over the resistance *r*17 being so great, that the bias over the resistance *r*13 is not sufficient to cause the glow discharge tube TKS in another marker to ignite its main gap at a pulse from the pulse generator PU.

Then the marker M can selected a free line pertaining to the called traffic route. The ignition of the glow discharge tubes TKM and TKF shows that no other marker selects a called line and the ignition of the glow discharge tube TK1 prevents other markers from starting a selection process. The voltage over the resistance *r*7 gives a current impulse over the condenser C2 and the resistance *r*8. The voltage drop over the resistance *r*8 is supplied over the wire *t*5 and the resistance *r*41 to the glow discharge tube VTP, the control gap of which is ignited. The main gap of the glow discharge tube VTP is ignited and the following circuit is completed: earth, the battery +180, the contact 149, the wire *t*1, the contact 322, the glow discharge tube VTP, the resistances *r*43 and *r*43, to minus. The voltage drop over the resistance *r*42 produces a current impulse through the link winding of all the transformers TM1—TM30, which are connected to free links over the wires 1—30 in the bundle of wires D and the contacts 11—40 on the relay AR1.

By way of example:

(*a*) If the link AL11 is free, a current impulse is received from the battery +180, over the contact 149, the wire *t*1, the contact 322, the glow discharge tube VTP, the resistance *r*43, the link winding of the transformer TM1, the rectifier *e*12, the wire 1 in the bundle of wires D, the contact 11, the wire *u*11 the windings on the operating magnets VP11 and VS11, to minus.

(*b*) If the link AL11 is busy, the operating magnet VP11 and VS11 are operated from + in the line equipment LR1 over the contact 113, the resistance *ra*, through the windings on the operating magnets VP11 and VS11, to minus. The voltage drop over the windings on the operating magnets VP11 and VS11 is always greater or equally great as the voltage drop over the resistance *r*42, and thus no current will arise over the rectifier *e*12 in this case.

The link AL11 is here supposed to be free. The current impulse through the link winding of the transformer TM1 induces a voltage in the right winding of the transformers, said voltage adding itself to the voltage from the battery +85 on the wire t6 so, that the control gap of the glow discharge tube TU1 is ignited. In the same manner all free links AL11, AL12 pertaining to the cross bar switch AP1 are marked. When the main gap of the glow discharge tube VTP is ignited, a voltage drop is obtained over the resistances *r*43 and *r*42, said voltage drop operating the glow discharge tube TKP over the resistances *r*44 and *r*45. The control gap of the glow discharge tube TKP is then ignited with a certain delay of time owing to the fact that the condenser C41 first is to be charged with current over the resistance *r*44. The delay has for a purpose to overbridge the above described procedure for indication of free links AL11, AL12. Then the main gap of the glow discharge tube TKP is ignited and a voltage drop over the resistance r46 gives a current impulse through the condensers C42 and the resistances r48 and r47 for all traffic routes. The voltage drop over the resistances r47 and r48 is not sufficient to ignite the glow discharge tube TP, provided that the glow discharge tube W is not ignited. As has been described above the glow discharge tube W for the called traffic route is however ignited, and thus the voltage drop existing over the resistance r47, due to the current through the glow discharge tube W, has charged the condenser C42 of the called traffic route to a higher voltage than the one existing in the corresponding condenser for the second traffic route. The voltage drop over the resistance r46 therefore causes the voltage over the control gap of the glow discharge tube TP pertaining to the called traffic route to increase sufficiently to be ignited.

Then the main gap of the glow discharge tube TP is ignited. The current through the glow discharge tube TP produces a voltage over the resistance r50. This voltage is supplied over the rectifier e4 and the wire w1 to the glow discharge tube LP in the line equipment of those lines which pertain to the called traffic route and among which a line is to be selected.

(a) If the line LS1 is free, the control gap and main gap of the glow discharge tube LP are ignited and a circuit is formed from the battery +180 over the contact 149, the wire t1, the contact 322, the glow discharge + TP, the rectifier e4, the wire w1, the glow discharge tube LP and the resistance r23, to minus.

(b) If the line LS1 is busy, the wire c in its line equipment is connected to + over the contact 123, the link AL11, the contact 113 and the contact in the line equipment LR1. The voltage over the resistance r50 cannot in this case ignite the glow discharge tube LP.

Here it is supposed that the line LS1 is free. The current through the glow discharge tube LP produces a voltage drop over the resistance r23, which by means of the condenser C10 is added to the bias, which the control gap of the glow discharge tube LS has from the battery +37, over the wire t3 and the resistance r22. The resulting voltage over the resistance r22 is supplied over the resistance r21, to the control gap of the glow discharge tube LS, which is ignited.

(a) If the link AL11, which during the selection process may be connected to the line LS1, is free, the anode of the glow discharge tube LS is, as has been described above, energized. The main gap of the glow discharge tube LS is ignited and the following circuit is completed: earth, the battery +180, the contact 149, the wire t1, the contact 322, the glow discharge tube TU1, the resistance r35 and the condenser C11, the right winding of the transformer VM1, the wire d1, the wire v1, the wire d, the glow discharge tube LS, the winding on the relay LSR, to minus. The relay LSR is not operated in this circuit.

(b) If the link AL11 is busy, the glow discharge tube TU1 is not ignited and the voltage of the exchange battery is not sufficient to ignite the main gap of the glow discharge tube LS. The current through the resistance r21 and the control gap of the glow discharge tube LS cannot operate the relay LSR.

The link AL11 is here supposed to be free and the glow discharge tube TU1 is supposed to be ignited according to what has been described above. When the main gap of the glow discharge tube LS is ignited, a current impulse is received through the condenser C11 and the right winding of the transformer VM1. This current impulse induces a voltage in the link winding of the transformer VM1. Thus the control gap of the glow discharge tube VU1 is ignited which gap has a bias from the battery +37 over the wire t3 and the exchange battery over the winding on relay R1. The main gap of the glow discharge tube VU1 is ignited and the following circuit is completed: earth, the battery +180, the contact 149, the wire t1, the resistance r34, the glow discharge tube VU1, the winding on the relay R1, to minus. The resistance r34 is so great, that only one of the glow discharge tubes VU1—VU30 at a time can ignite its main gap. Here it is presupposed that the glow discharge tube VU1 is ignited. The voltage drop over the resistance r34 causes a discharge of the condenser C21, which normally is charged in a circuit containing the battery +180, the contact 149, the wire t1, the resistance r34, the condenser C21, the rectifier e3 and the exchange battery. The discharge current from the condenser C21 passes the rectifier e3 in its locking direction and thus the potential of the cathode of the glow discharge tube BUT is lowered and the control gap of the glow discharge tube BUT is ignited in series with the resistance r25. The main gap of the glow discharge tube BUT is ignited and the relay R32 is operated in the following circuit: earth, the battery +180, the contact 149, the wire t1, the winding on the relay R32, the glow discharge tube BUT, the rectifier e3, to minus. The contacts 321—323 are actuated.

The contact 322 extinguishes the glow discharge tubes VTP, TKP and TP and all glow discharge tubes TU1—TU30, which mark free links. When the glow discharge tube TP is extinguished, all the glow discharge tubes LP, which mark free lines, are extinguished. The contact 321 short-circuits the resistance r34, the current through the glow discharge tube VU1 thus increasing so that the relay R1 attracts its armature. The glow discharge tube LS of the selected line LS1 is kept ignited in a circuit through the glow discharge tube VU1, over the rectifier e11, the wire d1, the wire v1, the wire d, the glow discharge tube LS, the winding on the relay LSR, to minus. The contact 323 closes a circuit for the relay R31, which is slow-operating.

During the make time of the relay R31 the following switching operation takes place. The contacts 211—213 are closed. The condenser C31 is over the resistances r31 and r32 recharged to the voltage of the exchange battery. The contact 211 connects the battery +85 over the wire t2 to the resistance r32 and a current impulse is obtained through the condenser C31, the rectifier e2, the wire t4, the resistance r16 and the battery +37. The voltage drop over the resistance r16 increases the voltage in the control gap of the glow discharge tube TK2 so, that it is ignited. The main gap of the glow discharge tube TK2 is ignited, and a strong current impulse is obtained from the battery +180, through the resistance r17, the glow discharge tube TK2, the condenser C5 and the resistance r18, to minus. A great voltage drop arises in the resistance r17, whereby the glow discharge tube TK1, which receives current through the resistance r15, is extinguished. After the condenser C5 has been recharged, the glow discharge tube TK2 operates with weak current through the rather high resistance r18. The voltage drop over the resistance r17 will be small and the voltage over the resistance r13 increases so, that a free marker, which receives a pulse from the pulse generator PU, may start a new selection process, due to the operation of its glow discharge tube TKS. When the glow discharge tube TK1 is then ignited, the glow discharge tube TK2 will be extinguished due to a strong impulse through the condenser C4.

In the marker M, which has selected the line LS1, the glow discharge tubes AT1 and VU1 are now ignited. The relays AR1 and R1 are operated. The contact 41 of the relay AR1 prevents other markers from receiving calls from incoming lines connected to the cross bar switch AP1. The selecting magnet HP11 indicates the line L1. The contact 212 of the relay R1 closes the following circuit: earth, the battery +180, the contact 149, the wire t1, the resistance r33, the contact 212, the wire d1, the wire v1, the wire d, the glow discharge tube LS, the winding on the relay LSR, to minus. The relay LSR attracts its armature and to the wire v1, which is multipled to all the outgoing lines from the cross bar switch AS1, there is supplied a plus potential, which prevents other markers from selecting an outgoing line connected to the cross bar switch AS1. The contact 21 is actuated and closes a circuit over the wire *e* through the winding on the selecting magnet HS10. The selecting magnet HS10 is actuated and indicates the line LS1.

Figure 4:
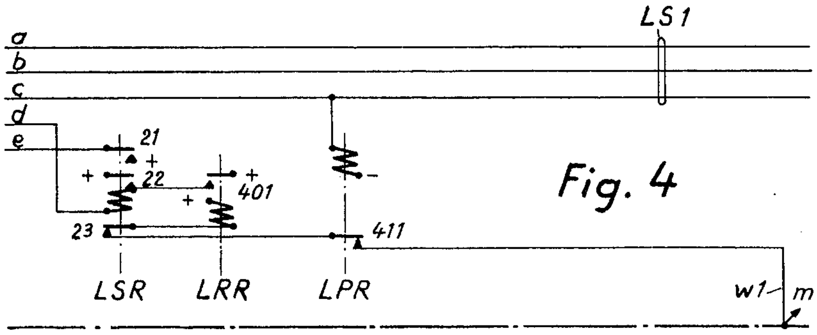
FIGS. 4–6 show different embodiments for the current closing means in a line equipment.

Then the relay R31 attracts its armature. The contact 311 is actuated and closes the following circuit: +, the contacts 311 and 213, the wire 1 in the bundle of wires D, the contact 11, the wire *u*11, the windings on the operating magnets VP11 and VS11, to minus. The operating magnets VP11 and VS11 are operated and actuate the contacts 111—113 and 121—123, the line L1 thus being connected to the line LS1. When the contact 113 is closed, a relay is connected in the line equipment LR1 between earth and the resistance *ra*. This relay releases the register REG, which in its turn releases the marker M. The contacts 131—134 and 141—149 are opened. When the contact 149 is opened all the glow discharge tubes in the marker M are extinguished, the relays AR1, AR0, R1, R32, R31 release their armatures and the marker can receive a new call. The glow discharge tube LS is extinguished, the relay LSR and the selecting magnets HP11 and HS10 release their armatures. The switching operation, which has been described above, is executed to a great extent by means of glow discharge tubes so as to reduce the busy time of the marker. Also the line equipment of the line LS is to some extent provided with glow discharge tubes. FIG. 4 intends to show that the invention also may be applied, if ordinary telephone relays are used. When the glow discharge tube TP in a marker is ignited, a circuit is formed over the rectifier *e*4, the wire *w*1, the contacts 411 and 23, through the winding on the relay LRR. The relay LRR attracts its armature. The contact 401 closes the following circuit: earth, the battery +180, the contact 149, the wire *t*1, the contact 322, the glow discharge tube TU1, the condenser C11, the right winding of the transformer VM1, the wire *d*1, the wire *v*1, the wire *d*, the winding on the relay LSR, the contact 401, earth. Through this circuit the line LS1 is selected if it is free. That the line LS1 is free is marked by the relay LRP having not attracted its armature, i.e. that the wire *c* is connected to earth. When the relay R1 in FIG. 3 is operated, also the relay LSR is operated through the glow discharge tube VU1 and the rectifier *e*11. The contacts 21—23 are actuated the selecting magnet HS10 is operated and switching is arranged as has been described above. During the remaining make time of the relay R31 and the make time of the operating magnets VP11 and VS11, the line LS1 is marked busy by the actuation of the contact 23. At the same time the relay LSR is kept energized over the contact 22.

Figure 5:
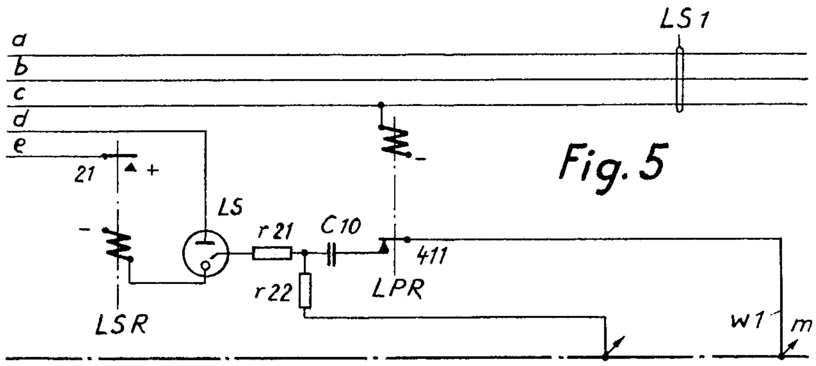

The line equipment of the line LS1 according to FIG. 5 differs from the one shown in FIG. 3 only therein that the glow discharge tube LP has been replaced by a relay LPR for indication of busy or free condition. The circuit over the wire *w*1, which ignites the glow discharge tube LP in dependence on whether the line LS1 is free or not, will here pass over the contact 411, the condenser C10 and the resistance *r*22. The contact 411 is closed if the line is free.

Figure 6:
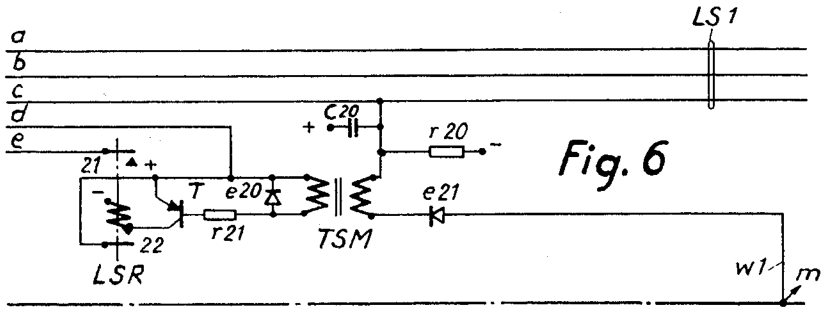

FIG. 6 shows how the glow discharge tubes LS and LP may be replaced by a transistor T with pertaining components and a rectifier *e*21. The resistance *r*50 in FIG. 3 is high, e.g. 12,000 ohms and the resistance *r*20 in FIG. 6 is still more high and thus a continuous current from the exchange battery over the wire *w*1 may be permitted over these resistances. When the glow discharge tube TP is ignited, a current impulse is obtained through the rectifier *e*4, the wire *w*1, the rectifier *e*21, the right winding of the transformer TSM and the condenser C20. This current impulse induces a voltage in the link winding of the transformer TSM, which voltage produces a current impulse between the emitter of the transistor and its base electrode and passes the resistance *r*21. If the line LS1 is free, the current impulse over the base electrode is sufficient so that a current impulse from the emitter to the collector will ignite the glow discharge tube VU1 in FIG. 3. Then the relay LSR is operated in the circuit over the main gap of the glow discharge tube VU1, the rectifier *e*11, the wire *d*1, the wire *v*1, the wire *d*, the transistor T and the winding on the relay LSR. The contact 21 is closed and the selecting magnet HS10 is operated as has been described above.

The transistor T may be designed in two different ways:

(*a*) If the transistor T is designed as amplifier, its conductivity ceases when the condenser C20 has been again charged. In this case a contact 22 on the relay LSR is needed for holding the relay in operated position.

(*b*) If the transistor T is a so-called "avalanche"-transistor, the current impulse through the right winding of the transformer should cause such a strong current between the emitter and the base electrode of the transistor T, that the limit value for the generation of a lasting current between the emitter and the collector is exceeded. In this case the contact 22 will be superfluous. The rectifier *e*20 protects the transistor against excess voltages, when the current through the right winding of the transformer is interrupted.

I claim:

1. In an automatic telephone system, incoming lines (L1—L*n*) and outgoing lines (LS1—LS*m*) belonging to different traffic routes; a group selection stage comprising primary and secondary cross-bar switches (AP1—AP*n*, AS1—AS*n*) including operating bars (P11, P12, S11, S12) and links (AL11, AL12) connecting said switches, a plurality of markers (M . . .) each including a traffic route determining device (OM) and a selection means (VU1, TU1, R1 . . . VU30, TU30, R30), said selection means comprising a plurality of idle-link marking members (TU1—TU30) and an equal plurality of line selecting members (VU1—VU30); each connected with one of said idle-link marking members, a route marking means (W, TP) in each marker for each traffic route, said incoming lines being connected to said primary switches and said outgoing lines being connected, one line from each route, to each of said secondary switches and to one of said route marking means; a time pulse generator (PU); a control device (TK) connected to said generator, said generator and said control device activating said markers, one by one, temporarily for selecting links and lines for setting up communications; a link testing conductor (*u*11, *u*12 . . .) for each link and each idler-line marking means (LS, LP in FIG. 3, LRR, LPR in FIG. 4, LS, LPR in FIG. 5 and T, *e*21, TSM in FIG. 6) including a testing conductor (*d*) for each outgoing line; connecting circuit means (RS, MS) for connecting a calling incoming line (L1) to an idle one of said markers (M); means (AT1, AR1 . . . AT*n*, AR*n*) in each of said markers for connecting the link testing conductors for all the links connectable to the respective calling incoming line to each one of said idle-link marking means to mark idle links during a subsequent selection for the marker; a testing conductor (*v*1—*vm*) for each secondary cross-bar switch, each of said testing conductors being multiplied to a corresponding line selecting member in each of said markers and to the line testing conductor for all outgoing lines connected to the secondary cross-bar switch; a route marking conductor (*w*1—*sq*) for each traffic route, each of said route marking conductors being multiplied to the corresponding one of said route marking means in said markers and to said idle-line marking means for all outgoing lines belonging to the traffic route, said route determining device actuating said route marking means in response to a pulse from said pulse generator and said route marking means actuating the idle-line marking means for all idle lines in the respective route, said idle-link marking members in response to said actuation of the idle-line marking means actuating said line selecting members corresponding to idle links and the first line-selecting member becoming operated selecting the corresponding outgoing line and blocking the other line-selecting members, the respective marker setting up a communication between the calling line and the selected outgoing line through the link corresponding to the first operated line-selecting member.

2. An automatic telephone system according to claim 1 and further comprising relay means (LSR) connected to said idle-line marking means for each outgoing line, said relay means being operated in response to the respective idle-line marking means being actuated from said route marking means and the selection of a line from the respective marker during a test pulse from the generator, and a holding circuit for said relay means including the respective marker and the respective testing conductor (*e*) for holding the relay means operated upon termination of the test pulse, said relay means controlling a contact (21) for closing an operating circuit for setting up said communication when the relay means is operated.

References Cited in the file of this patent

UNITED STATES PATENTS

| | | |
|---|---|---|
| 2,348,626 | Holden | May 9, 1944 |
| 2,582,959 | Bruce | Jan. 22, 1952 |
| 2,603,716 | Low | July 15, 1952 |
| 2,761,012 | Murray | Aug. 28, 1956 |
| 2,790,031 | Bakker | Apr. 23, 1957 |
| 2,853,556 | Gohorel | Sept. 23, 1958 |